United States Patent [19]

Elias

[11] 4,284,130
[45] Aug. 18, 1981

[54] HEATING INSTALLATION HAVING A RADIATION- AND CONVECTION FLOOR HEATER

[76] Inventor: Jiri Elias, Im Wingert 18, Zürich, Switzerland

[21] Appl. No.: 712,410

[22] Filed: Aug. 6, 1976

[30] Foreign Application Priority Data

Aug. 21, 1975 [CH] Switzerland .................. 10935/75

[51] Int. Cl.$^3$ ............................................. F24D 5/10
[52] U.S. Cl. ............................................. 165/53
[58] Field of Search .................. 165/22, 49, 50, 53, 165/56

[56] References Cited

U.S. PATENT DOCUMENTS

| | | | |
|---|---|---|---|
| 3,008,695 | 11/1961 | Melle | 165/50 |
| 3,148,727 | 9/1964 | Meckler | 165/49 |
| 3,693,705 | 9/1972 | Stotz | 165/53 X |

*Primary Examiner*—Samuel Scott
*Assistant Examiner*—Theophil W. Streule, Jr.
*Attorney, Agent, or Firm*—Ladas & Parry

[57] ABSTRACT

A heating installation equipped with a radiation- and convection floor heater for heating a room by means of a liquid heat carrier, comprising a device for heating the heat carrier, a circulation pump for circulating the heat carrier, and inflow line and return flow line for the heat carrier. The room is heated by a radiation- and convection floor heating element comprising a pipe through which flows the heat carrier. The pipe is arranged in a hollow space having a starting portion and a terminal portion. The hollow space is further provided with an inflow opening and an outflow opening. The starting portion of the hollow space communicates via the inflow opening with the heated room and the terminal portion of the hollow space communicates via the outflow opening with the heated room. The heated air in the hollow space, which flows through the heated room, is circulated by natural ventilation or forced ventilation.

10 Claims, 8 Drawing Figures

HEATING INSTALLATION HAVING A RADIATION- AND CONVECTION FLOOR HEATER

BACKGROUND OF THE INVENTION

The present invention relates to a new and improved construction of a heating installation comprising a radiation and convection floor heater for heating a room with a liquid heat carrier, comprising a device for heating the heat carrier, a circulation pump, an inflow line and return flow line and at least one radiation- and convection floor heating element.

Floor heaters are known which, as radiation heating surfaces, predominately deliver the heat by radiation to a room or space. The utilization of radiation heaters is associated with certain hygenic and also economical advantages in contrast to conventional heating systems. A particular advantage of radiation heating is the freedom from dust contamination.

However, there prevail almost static air conditions which, from the hygenic standpoint, must be considered to be disadvantageous. According to certain research results regarding the physiological thermal balance of the human being there exists a limitation of the surface temperature and the given thermal output. For the floor the limitation of the surface temperature is 26° C. With present day technology attempts are made to deliver more thermal energy through the floor at the region of the windows and the outer walls. Nontheless, in a number of instances one is forced to combine the floor heating with radiator heating, or else to exceed the recommended surface temperature (26° C.).

SUMMARY OF THE INVENTION

Hence, it is a primary object of the present invention to provide an improved construction of heating installation having a radiation- and convection floor heating arrangement which is not associated with the aforementioned drawbacks and limitations of the prior art proposals.

Another and more specific object of the present invention aims at completely satisfying the room-thermal requirements by means of floor heating with a balanced temperature course and the recommended surface temperature (26° C.).

The heating installation of the invention is manifested by the features that a room is heated by a radiation- and convection floor or base heating element.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
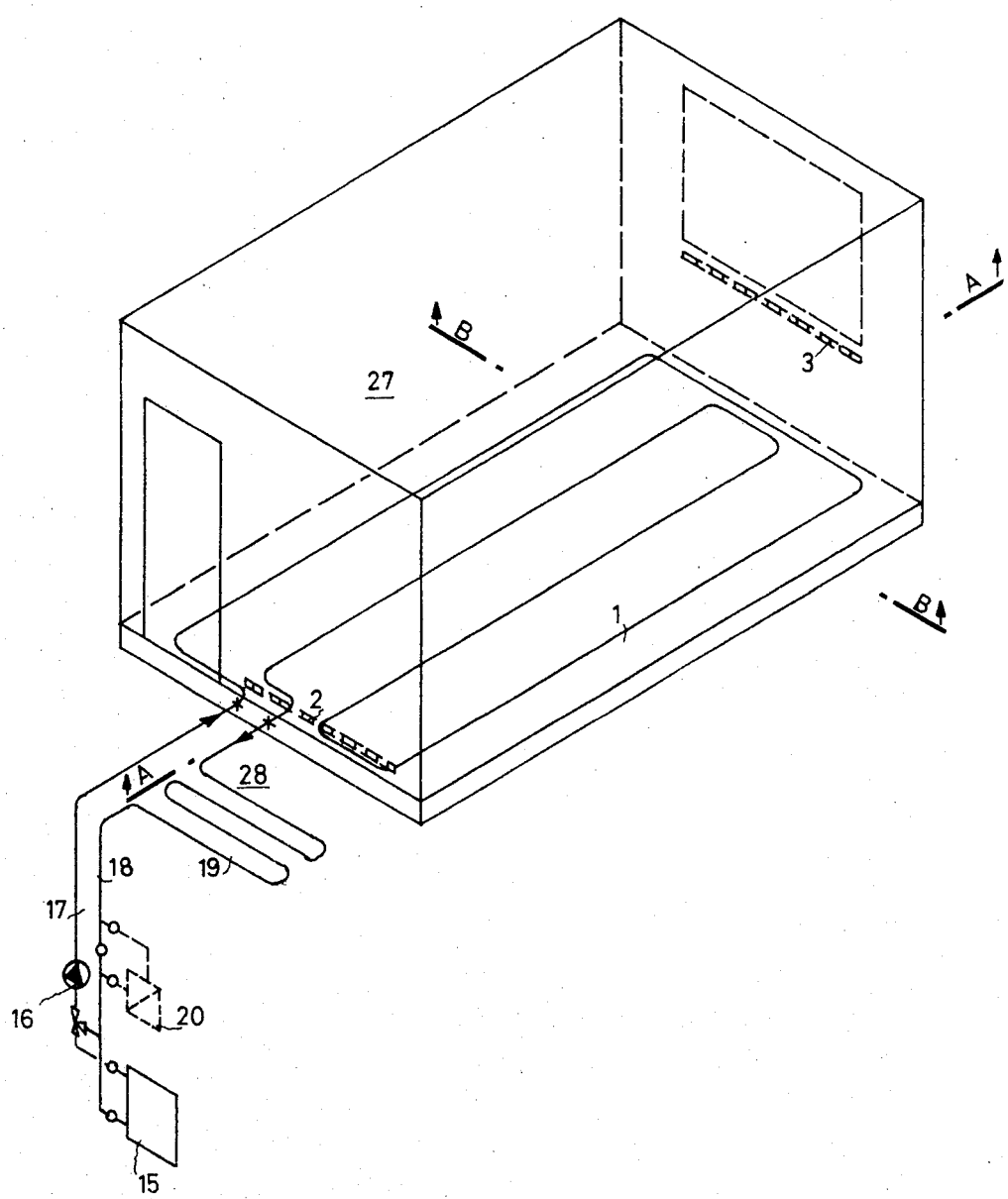
FIG. 1 illustrates the principles of a heating installation for heating a room and an adjacent room.

Describing now the drawings, the heating installation illustrated in principle in FIG. 1, serves to heat a room 27 and an adjoining room 28. This heating installation comprises a device 15 for heating a liquid heat carrier, an infeed line 17 for the infeed of the heated heat carrier to the heating element, a return flow line 18 for the delivery of the cooled heat carrier to the heat generator 15, and a circulation pump 16 for conveying the heat carrier through the pipe system.

Figure 2:
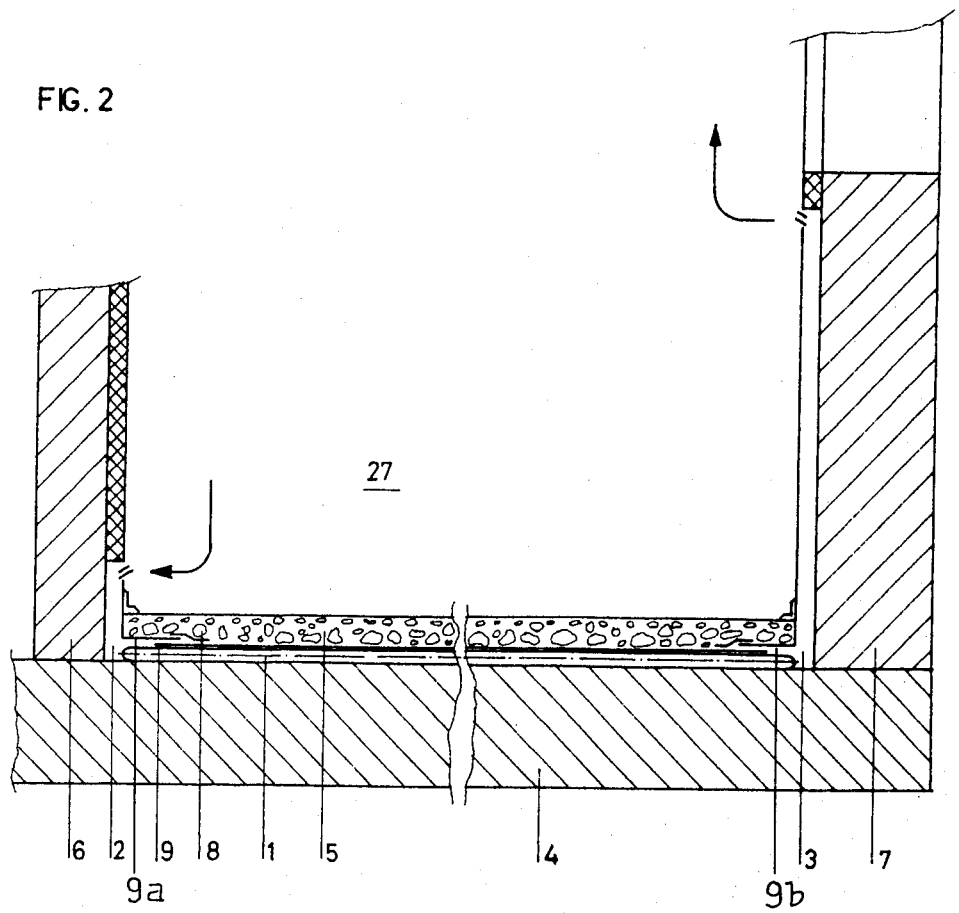
FIG. 2 is a sectional view along the section line A—A of FIG. 1.
Figure 3:
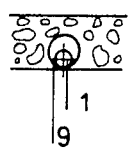
FIG. 3 is a sectional view along the section line B—B of FIG. 1 illustrating an embodiment of the heating element.
Figure 4:
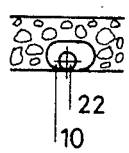
FIG. 4 is a sectional view of a second embodiment of the heating element.
Figure 5:
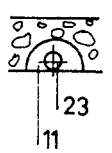
FIG. 5 is a third embodiment of the heating element.
Figure 6:
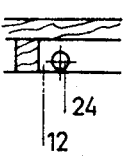
FIG. 6 is a fourth embodiment of the heating element.
Figure 7:
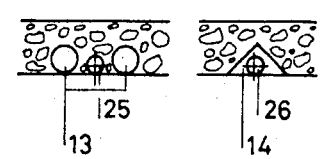
FIG. 7 is a fifth embodiment of the heating element.
Figure 8:
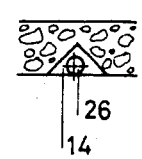
FIG. 8 is a sixth embodiment of the heating element.

A portion of the most important element of a heating element has been shown in FIGS. 2, 3. Such heating element comprises a tube or pipe 1 arranged in a hollow space 9 which in cross-section may be circular (FIG. 3), oval (FIG. 4), semicircular (FIG. 5), rectangular (FIG. 6) or triangular (FIG. 8). The start or starting portion 9a of the hollow space 9 is connected with an inflow opening 2 and the end or terminal portion 9b of the hollow space 9 is connected by an outflow opening 3 with the heated room 27.

The heat carrier flowing through the pipe 1 is cooled therein because it transmits its thermal energy to the material 5, surrounding the pipe, of the floor to be heated (radiation) and the surrounding air in the hollow space 9. The heated air in the hollow space 9, which flows through the heated room 27, is circulated by natural ventilation or forced ventilation. The proportion between radiation and convection is governed by the circulated quantity of air. It is, for instance, assumed that the room 27 has a volume of 36 m³ (length 5 meters, width 3 meters height 2.4 meters) and a thermal or calorific requirement of 1620 kcal/h (45 kcal/m³h). With an average base or floor surface temperature of 26° C. and a room temperature of 18° C. the coefficient of heat transfer amounts to 8.9 kcal/m²h grd. The heat transfer for 1 m² area is: $Q_1 = 8.9\ (26-18) = 71.2$ kcal/m²h. Thus, the floor surface of 15 m² only covers $15 \times 71.2 = 1068$ kcal/h.

An increase of the pipe heating surface in the floor would not be acceptable for a living room, because then also the floor temperature would increase. The missing thermal capacity of $(6920 - 1068 =) 552$ kcal/h must be furnished by convection.

The required air quantity for an inflow temperature of 45° C., specific heat of 0.31 kcal/m³ grd is:

$$V_1 = \frac{552}{0.31\ (45-18)} = 66\ m^3/h.$$

With an opening cross-section ratio of 0.9 and an elevational difference of 0.7 of the inlet and outlet openings, an inflow opening cross-section of $1.2 \times 0.03 = 0.036\ m^2$, a Poisson ratio of 0.6 and a specific hourly air quantity of 2900 m³/h, the air quantity amounts to:

$$V_2 = 2900 \times 0.7 \times 0.036 = 73\ m^3/h.$$

As will be clearly apparent from the example, the radiation- and convection floor or base heating allows completely heating a room having a high thermal requirement, and with optimum conditions for the physiological thermal balance of a human being. There do not exist static air conditions, yet the air flow remains within a comfortable range and insures for a balanced temperature course of the heated room. The adjacent rooms 28 (bathroom, corridor) having a smaller specific thermal requirement can be heated by the return flow. The heating installation containing a radiation- and convection base heating can be operated with the normal infeed temperatures 90°/70° C., which correspond to the high economies and the favourable investment costs.

The installation illustrated in FIG. 1 may alternatively be used for cooling the rooms 27 and 28. To this end, the installation includes means 20 for cooling the heat carrier.

FIG. 8 illustrates that the tube or pipe 1 may be replaced by an electrical heating element.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An installation for controlling the temperature of a room, wherein the floor of the room is formed with at least one channel which is provided with at least two openings establishing communication between the room and the interior of the channel at two positions which are spaced apart along the channel so that air of the room can enter the channel by way of one opening and can pass along the channel and return to the room by way of the other opening, at least one elongate floor element is arranged in parallel to said channel and in thermally-conductive contact with the interior thereof to influence the temperature of air passing along said channel, and a device is connected to the floor element for controlling the temperature thereof whereby the extent to which the floor element influences the temperature of air passing along the channel may be controlled.

2. An installation as defined in claim 1, wherein said floor element is a pipe through which flows a heat carrier, and said device connected to the floor element is a device for changing the temperature of said heat carrier.

3. An installation as defined in claim 1, wherein said floor element is arranged in the floor adjacent said channel.

4. An installation as defined in claim 1, wherein said floor element is arranged with play in said channel.

5. An installation as defined in claim 1, wherein said channel has an oval, circular, semi-circular, rectangular or triangular cross-section.

6. An installation as defined in claim 2, provided with a circulation pump for said heat carrier.

7. An installation as defined in claim 2, wherein said device for changing the temperature of the heat carrier comprises a device for heating the heat carrier.

8. An installation as defined in claim 2, wherein said device for changing the temperature of the heat carrier comprises a device for cooling the heat carrier.

9. An installation as defined in claim 1, wherein said floor element is an element which can be supplied with electrical current.

10. An installation as defined in claim 1, wherein one of the openings from said channel into the room is higher than the other opening from said channel into the room.

* * * * *